(No Model.)
J. HARRIS.
COVER FOR FRUIT PACKAGES.
No. 293,456. Patented Feb. 12, 1884.
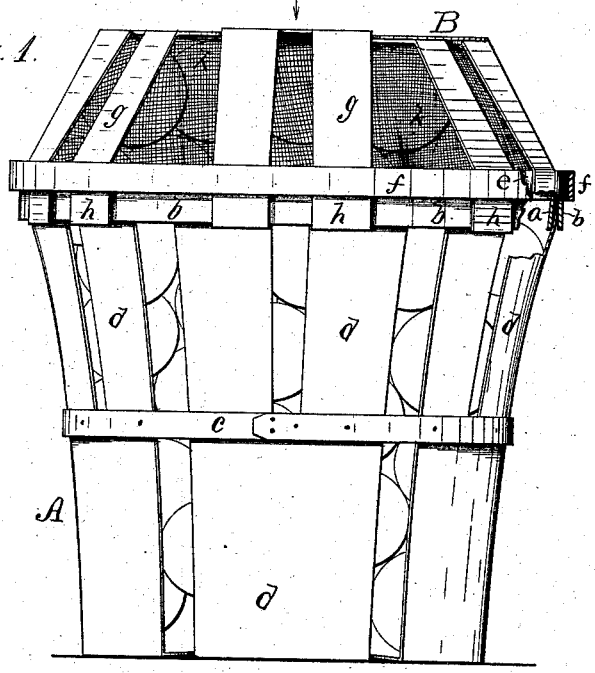
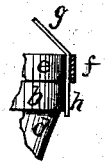
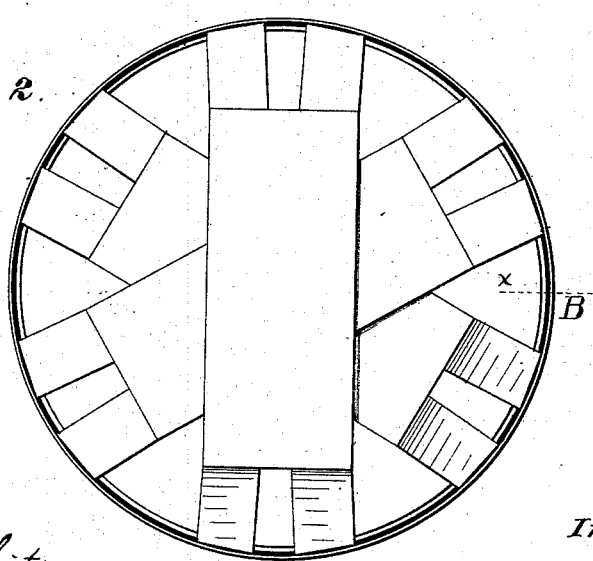
Attest:
L. G. Whitmore.
Geo. W. Tuttle
Inventor:
J. Harris.
By E. B. Whitmore, Atty.

UNITED STATES PATENT OFFICE.

JULIUS HARRIS, OF RIDGEWAY, NEW YORK.

COVER FOR FRUIT-PACKAGES.

SPECIFICATION forming part of Letters Patent No. 293,456, dated February 12, 1884.

Application filed October 11, 1883. (No model.)

*To all whom it may concern:*

Be it known that I, JULIUS HARRIS, of Ridgeway, in the county of Orleans and State of New York, have invented a new and useful Improvement in Covers for Fruit-Packages, which improvement is fully set forth in the following specification and accompanying drawings.

Peaches are now largely shipped by express, and there is always a great loss sustained by growers of and dealers in them and other like tender and perishable fruit in shipping, on account of bruising and decay incident to the necessary frequent handling of the packages. Crates were formerly used in which to ship such fruit; but, for several reasons, their use has been abandoned, and conical baskets used almost wholly instead. These baskets are much cheaper than crates, and fruit put up in them sells much more readily than when put up in crates, for the reasons that it can be more readily inspected by the purchaser and has a more attractive appearance. Such baskets have been used very much without covers, or have been covered merely with netting, although more rigid covers of an objectionable nature have sometimes been employed; but no covers, so far as I know, have yet been made that are practical and satisfactory. It is desirable to have a light wooden cover over the netting and fruit of sufficient strength to protect both from injury during transportation, as the baskets are then piled either upon their sides or ends, one upon another, in cars or wagons. It is also desirable to have the cover made to fit on the outside of the mouth or upper end of the basket, or close over the same, for the purpose of strengthening or supporting the basket, so that it may not readily become flattened from compression when piled with others in a horizontal position. The mouth of a round or cylindrical basket of the kind shown is not braced or supported, and when not re-enforced by a stiff cover is easily flattened by external pressure when exerted in diametrical directions, from which flattening of the basket, when filled with fruit, the latter is liable to be greatly injured. A stiff cover, when made to inclose or surround the periphery of the mouth or unsupported end of the basket, adds its strength to that of the latter, and both together form a strong package. To render the whole strength of the cover available, the latter should fit snugly upon the outside of the outer hoop at the mouth of the basket, as stated.

Covers have been made with extended parts or projections, that imperfectly fit or loosely hold the inner hoop at the mouth of the basket, but, not including the upper ends of the staves or the outer hoop directly, give no support or strength to either of those parts. To produce a cover constructed of light splints stayed at their ends that will protect the fruit at the top of the basket and the netting drawn over the same, and inclose the whole of the upper end of the basket, so as to strengthen the latter, and also hold the netting, is the object of my invention, which invention is hereinafter fully described, and more particularly pointed out in the claims.

Referring to the drawings, Figure 1 is a side elevation of a basket, in common use for shipping fruit, with my improved cover attached, parts being broken away and sectioned on the dotted line *x* in Fig. 2; Fig. 2, a plan of the cover viewed as indicated by arrow in Fig. 1; and Fig. 3, a detached figure, showing more clearly the exterior hoop at the mouth of the basket, the contiguous internal hoop of the cover, and the manner in which the ends of the staves or splints of the cover grasp the hoop of the basket, the outer hoop of the cover being sectioned.

Referring to the parts, A is the body of the basket or package, preferably made conical or flaring at the mouth, constructed of staves or splints *d*, substantially in the usual form, provided with the external hoops, *b* and *c*, and the internal hoop, *a*. B is the cover, also preferably made conical, as shown, constructed of splints *c*, having their ends bent downward and secured between an internal hoop or stay, *e*, and an opposing external hoop or stay, *f*, similarly to the manner in which the staves of the basket are secured by the hoops *a* and *b*. Toward the ends the splints *g* are turned obliquely downward, preferably at an angle of about forty-five degrees from the plane of the upper surface of the cover, and at their extreme ends at $h$ they are turned vertically downward and secured to the hoops $e$ and $f$, as stated, the ends extending a short distance below the said hoops, as shown. The hoops of the cover are made of such relative diameters with reference to the diameters of the hoops at the mouth of the basket that the ends $h$ of the splints fit snugly against the outer surface of the hoop $b$ of the basket when the cover is pressed to place thereon. In the construction shown the lower edge of the inner hoop of the cover rests against the upper edge of the outer hoop of the basket when the cover is put to place thereon, the outer hoop of the cover overhanging the basket, which brings the ends $h$ of the splints of the cover in position to bear against the outer surface of the hoop $b$, as stated.

In packing the fruit for the market or for shipping a sheet of netting, $k$, is first laid over the fruit, after which the cover is put to place, as above stated, the netting being drawn tightly over the fruit by the downward motion of the cover as it is pressed upon the basket, said netting being held securely by the friction between the overlapping ends $h$ of the cover and the hoop $b$ of the basket. To secure the cover more firmly upon the basket—for shipping great distances, for instance—twine may be used to wind or tie around the contiguous hoops of the same; and when thus secured the packages may be inverted without injury to the fruit and thus packed in cars; or they may be packed lying on their sides, with the large end of one basket over the small end of another, thus economizing in the use of the space in the car.

Covers for fruit-baskets similar to the one here described, having the ends of the splints projecting below the hoops thereof, have been used before. Such I do not broadly claim; but

What I claim as my invention, and wish to secure by Letters Patent, is—

1. In combination with a basket for holding fruit, a cover, B, for the same, consisting of splints $g$, substantially as shown, having a portion of each splint near the respective ends thereof bent obliquely downward, and the extreme ends of each of said splints bent vertically downward and secured to one or more hoops or stays, $e\ f$, the vertical ends $h$ of said splints projecting below the lower edges of said hoops or stays and fitting against the outer surface of the external hoop, $b$, of the mouth of the basket to strengthen the latter, substantially as set forth.

2. In combination with a basket for holding fruit and a cover for the fruit, consisting of netting or similar fabric, an outer cover or protector for the fruit and netting, consisting of splints $g$, substantially as shown, having a portion of each splint near its ends bent obliquely downward, and the extreme ends of each of said splints bent vertically downward and secured between concentric opposing hoops or stays $e$ and $f$, the vertical ends $h$ of said splints projecting below the lower edges of said hoops or stays and pressing tightly against the outer surface of the external hoop of the mouth of the basket, to strengthen the latter and hold the netting, substantially as shown and set forth.

JULIUS HARRIS.

Witnesses:
E. B. WHITMORE,
M. D. PHILLIPS.